Patented June 23, 1942

2,287,188

UNITED STATES PATENT OFFICE 2,287,188

STABILIZING VINYL AROMATIC RESINS AGAINST LIGHT

Lorne A. Matheson and Raymond F. Boyer, Midland, Mich., assignors to The Dow Chemical Company, Midland, Mich., a corporation of Michigan No Drawing. Application May 6, 1940, Serial No. 333,598

18 Claims. (Cl. 260—91)

This invention concerns a method and certain addition agents for stabilizing the resinous polymers of vinyl aromatic compounds against the discoloration which they normally undergo upon exposure to light over long periods of time.

Polystyrene is known to possess a unique combination of properties which render it useful for a wide variety of purposes. It is a clear, colorless, transparent thermo-plastic resin having exceptional dielectric properties and also having an unusually high index of refraction. These properties render it useful for the preparation of molded articles; for the preparation of optical lenses; for use in varnishes and lacquers; etc. These same properties and uses are shared to more or less extent by other resinous polymers and co-polymers of vinyl aromatic compounds, e. g. ethyl vinyl benzene, divinyl benzene, parachloro - styrene, ortho - chloro - styrene, para - methyl-styrene, the co-polymer of styrene with diallyl maleate or with divinyl benzene, etc. Such resins are herein referred to generically as "vinyl aromatic resins."

However, polystyrene and other vinyl aromatic resins tend to undergo gradual discoloration upon standing and this property detracts from their utility for many of the purposes to which they are otherwise well suited. The cause of the discoloration is not thoroughly understood, but it appears to be due primarily to the action of light. Contamination with aldehydes, peroxides such as benzoyl peroxide, sulphur, or metals such as tin, iron or zinc, or the application of heat usually promote the rate of discoloration.

It is an object of this invention to provide certain addition agents which may be incorporated in small proportion with the vinyl aromatic resins to retard or prevent the discoloration.

In our co-pending application, Serial No. 279,914, filed June 19, 1939, of which this application is a continuation-in-part, we have disclosed that certain amines, when incorporated with vinyl aromatic resins, stabilize the latter against discoloration by light, but that this stabilizing action is not common to all amines; in fact, many amino compounds have the opposite property of promoting the discoloration by light of vinyl aromatic resins with which they are incorporated. In some instances amines of quite similar molecular structure affect in opposite manner the light stability of the resins. Due to lack of a general definition of the amines having a stabilizing action on the resins, the co-pending application, Serial No. 279,914, was restricted to the individual amines which had been found to be stabilizers for the resins.

We have now found that the amines which may satisfactorily be used to stabilize vinyl aromatic resins against discoloration by light are those having ionization constants above $10^{-9}$ and boiling points above 200° C. at atmospheric pressure. The amines which have ionization constants less than $10^{-9}$ usually have little or no stabilizing effect upon the resins and in many instances they actually promote the rate of discoloration. The amines having normal boiling points below 200° C. tend, in most instances, to evaporate gradually from vinyl aromatic resins which have been treated therewith and to cause blushing of the resins.

The relative effectiveness of the various amines having normal boiling points above 200° C. and ionization constants greater than $10^{-9}$ is dependent upon the kind of amine employed and the amount by which its ionization constant exceeds $10^{-9}$. In general, secondary and tertiary amines appear to be somewhat more effective than primary amines for the present purpose, although certain of the primary amines are excellent light stabilizers. Amino alcohols, e. g. alkanol amines, amino glycols, etc., are good light stabilizers for the resins. The derivatives of morpholine and piperazine having the above stated properties are also highly effective. The stabilizing action of amines of similar molecular structure becomes more pronounced with increase in their ionization constants. In practice, we prefer to employ as the stabilizing agents amines having ionization constants of $10^{-7}$ or higher.

The stabilizing agent is usually incorporated with the resin in amount corresponding to between 0.01 and 3, preferably between 0.1 and 3, per cent of the weight of the resin, but it is somewhat effective as a stabilizer regardless of the proportion employed. Use of the stabilizer in the small proportions just stated not only results in increased stability of the resin toward light, but often also improves the strength characteristics of the resin. The incorporation of more than 3 per cent of stabilizing agent with a vinyl aromatic resin sometimes, but not always, causes blushing or crazing of the product. The tendency toward the development of these defects becomes less with increase in the boiling point (and resultant decrease in the volatility) of the stabilizing agent, and in practice we preferably employ as such agent an amine boiling at above 250° C. at atmospheric pressure. In some instances as much as 50 per cent by weight or more of such high boiling amine may be incorporated in a vinyl aromatic resin without causing crazing or blushing.

As hereinbefore mentioned, the presence of aldehydes, peroxides, sulphur, or of metals such as iron, copper or zinc, accelerates the rate at which a vinyl aromatic resin is discolored by light; hence the resins treated with the stabilizing agents of this invention are preferably free of such impurities. Aldehydes or peroxides, if present in appreciable proportion, e. g. 0.5 per cent or more by weight, are particularly detrimental since they may react with the stabilizing agent to form a colored compound. However, the presence of said impurities in small proportion, or of the other discoloration accelerators mentioned above, is not prohibited since the benefits of the stabilizing agents are obtained even though such accelerators be present; i. e. regardless of whether or not such discoloration accelerator is present in a given vinyl aromatic resin, a sample of the resin containing one of the stabilizing agents provided by the invention is less readily discolored by light than is the same resin in the absence of the stabilizing agent.

The stabilizing agent may be incorporated with the resin in any of several ways. It is preferably added to the vinyl aromatic compound before polymerization and the polymerization is carried out in its presence, but the stabilizing agent and the polymer may be dissolved together in a volatile mutual solvent and the latter thereafter be evaporated. Although the mode of incorporating the stabilizing agent is of minor importance, it is desirable that the agent be distributed as uniformly as possible throughout the mass.

Vinyl aromatic resins which have been stabilized in accordance with the invention are, of course, far superior to the resins alone for the preparation of optical lenses, transparent molded articles, electrical insulating parts which are to be exposed to the weather, colorless varnishes for outdoor use, etc. They may also advantageously be used to stabilize colored vinyl aromatic resins, e. g. resins containing a dye or pigment, to protect them against change in tint or shade upon prolonged exposure to light. It will be understood that the vinyl aromatic resins stabilized in accordance with the invention may also contain plasticizing agents, fillers, etc.

Example

The purpose of this example is to demonstrate that amines of similar structural formula become increasingly effective as light stabilizers for vinyl aromatic resins as their ionization constants become higher. For purpose of fully demonstrating this discovery, there are included in the table certain amines which are not well adapted to use as stabilizers for the resins. The experiments reported in the table were carried out by adding, to separate portions of styrene, the respective amines named in the table in the proportions also given and then polymerizing the samples by heating them at 125° C. for approximately 7 days. Samples of pure polystyrene containing no stabilizing agent were prepared by polymerizing styrene alone under similar conditions. The resinous polymers were molded at a temperature of 160° C. into plates of the same thickness. The plates were then aged by exposure to light from a carbon electrode arc lamp for 400 hours. The light from the lamp was rich in ultraviolet light. Its intensity was such as to discolor pure polystyrene in 400 hours to about the same extent that polystyrene is discolored upon one year of exposure to ordinary daylight in the northern part of the United States. In carrying out the aging tests, each plate of polystyrene which contained an amine was placed near a plate of pure polystyrene so that the two pltaes would be exposed to light of the same intensity and the results obtained would be comparable. After completing the aging tests, the transparency value of each plate was measured by exposing the plate to ultraviolet light and determining the per cent of the light transmitted through the plate. From the data so-obtained, the stabilizing effect of each amine was calculated in accordance with the formula $$\text{Stabilizing effect} = 100\frac{X-Y}{Y}$$

wherein $X$ represents the transparency of a sample containing an amine and $Y$ represents the transparency of the sample of pure polystyrene which was simultaneously aged by exposure to light of the same intensity. It may be mentioned that the decrease in transparency of a sample which occurs during aging under the foregoing test conditions is due to discoloration of the sample by light. The table names the amines used, gives their ionization constants, "$K$," and states the proportion in which each was employed as per cent of the weight of styrene treated therewith. It also gives the stabilizing effect of each amine. In the table, the amines are grouped according to their molecular structures.

Table

| Test No. | Amine Kind | K | Percent | Stabilizing effect |
|---|---|---|---|---|
| | Alkylamines: | | | |
| 1 | Dioctylamine | $4\times10^{-9}$ | 1 | 63 |
| 2 | Chloro - amyl amyl amine | $6.2\times10^{-5}$ | 1 | 86.5 |
| 3 | Dibenzyl amine | $7.8\times10^{-5}$ | 1 | 93.5 |
| 4 | Diamyl amine | $9.6\times10^{-4}$ | 1 | 115 |
| | Alkylene poly-amines: | | | |
| 5 | Hexamethylene tetramine | $6.9\times10^{-9}$ | 1 | 13 |
| 6 | 1.3.5 - trimethyl trimethylene tri-amine | $5\times10^{-5}$ | 1 | 41 |
| 7 | Diethylene tri-amine | $2\times10^{-5}$ | 1 | 167 |
| | Heterocyclic amines: | | | |
| 8 | Indole | $4\times10^{-13}$ | 1 | −100 |
| 9 | Quinoline | $1\times10^{-9}$ | 1 | −87 |
| 10 | Beta - (N - morpholino) di-ethyl ether | $6.3\times10^{-8}$ | 1 | 36 |
| 11 | Beta - N - morpholino-ethanol | $1.1\times10^{-7}$ | 1 | 109 |
| | Mono-alkanol amines: | | | |
| 12 | 2 - amino - 2 - methyl - propanol | $5\times10^{-5}$ | 1 | 57 |
| 13 | 2-amino-hexanol-3 | $3.6\times10^{-4}$ | 1 | 86.6 |
| 14 | Mono-ethanol amine | $6.9\times10^{-4}$ | 0.2 | 100 |
| | Di-alkanol amines: | | | |
| 15 | Di-ethanol amine | $8\times10^{-6}$ | 0.2 | 110 |
| 16 | Di-isopropanol amine | $8\times10^{-6}$ | 1 | 183 |
| | Tri-alkanol amines: | | | |
| 17 | Tri-ethanol amine | $5.6\times10^{-7}$ | 0.3 | 122 |
| 18 | Tri-isopropanol amine | $7\times10^{-7}$ | 1 | 176 |
| | Tertiary amines containing one alkanol group: | | | |
| 19 | N - di - octyl ethanol amine | $6.2\times10^{-9}$ | 0.5 | 100 |
| 20 | N - di - cyclohexyl ethanol amine | $3.2\times10^{-5}$ | 1 | 127 |
| 21 | N - di - butyl ethanol amine | $3.2\times10^{-4}$ | 1 | 158 |
| | Tertiary amines containing two alkanol groups: | | | |
| 22 | N - phenyl di - ethanol amine | $3.2\times10^{-10}$ | 1 | 0 |
| 23 | N - ethyl di - ethanol amine | $5\times10^{-6}$ | 1 | 100 |
| 24 | N - butyl di - ethanol amine | $4.7\times10^{-5}$ | 1 | 140 |
| | Amino-glycols: | | | |
| 25 | 2 - amino - 2 - methyl - 1.3-propane-diol | $6\times10^{-5}$ | 1 | 90 |
| 26 | 3 - diethylamino - 1.2-propane-diol | $2.5\times10^{-4}$ | 1 | 95.3 |

Other amino compounds having normal boiling points above 200° C. and ionization constants greater than $10^{-9}$ may be used instead of those specifically mentioned in the table. Examples of such other amino compounds useful as light-stabilizers for the vinyl aromatic resins are: N-(beta-vinyloxy-ethyl) morpholine, beta-morpholino-beta'-phenoxy diethyl ether, beta-morpholino-beta'-(2-xenoxy) diethyl ether, N,N'-diphenyl piperazine, beta-N-methylanilino-beta'-(2-cyclohexyl-phenoxy) diethyl ether, and N-(beta-phenoxy-ethyl)-aniline, etc.

The stabilizing agents provided by the invention may be employed, as hereinbefore described, for the stabilization against discoloration by light of other vinyl aromatic resins, e. g. the solid polymers of para-chloro-styrene, para-ethyl-styrene, divinyl benzene, and the co-polymers of styrene and divinyl benzene, etc.

It may be mentioned that certain amines having ionization constants greater than $10^{-9}$ are marketed in a form containing impurities which detract from their stabilizing action toward vinyl aromatic resins. In such instances, it is advisable to purify the amines prior to employing them in accordance with the invention.

When the invention is practiced by adding the amine stabilizer to a liquid vinyl aromatic compound prior to polymerization, the polymerization should be carried out as completely as possible or steps should be taken to remove from the product the unpolymerized vinyl aromatic compound, since the presence of the latter accelerates discoloration of the product by light and thereby counteracts to some extent the stabilizing action of the amine.

In most instances the amine stabilizers may, if desired, be added in the form of their hydrohalides, e. g. hydrochlorides or hydrobromides, to obtain appreciable stabilization of the vinyl aromatic resins.

Other modes of applying the principle of the invention may be employed instead of those explained, change being made in the method or compositions herein disclosed, provided the steps or ingredients stated in any of the following claims or the equivalent of said steps or ingredients be employed.

We therefore particularly point out and distinctly claim as our invention:

1. A plastic composition comprising a vinyl aromatic resin and, as an agent for stabilizing the resin against discoloration by light, an amine having an ionization constant greater than $10^{-9}$ and having a boiling point above 200° C. at atmospheric pressure.

2. A polymer of a vinyl aromatic resin stabilized against discoloration by light with between 0.01 and 3.0 per cent by weight of an amine having an ionization constant greater than $10^{-9}$ and having a boiling point above 200° C. at atmospheric pressure.

3. A plastic composition comprising a vinyl aromatic resin and, as an agent for stabilizing the resin against discoloration by light, an amine having an ionization constant greater than $10^{-7}$ and having a boiling point above 200° C. at atmospheric pressure.

4. A vinyl aromatic resin stabilized against discoloration by light with between 0.1 and 3.0 per cent by weight of an amine having an ionization constant greater than $10^{-7}$ and a boiling point above 200° C. at atmospheric pressure.

5. A plastic composition comprising a vinyl aromatic resin and, as an agent for stabilizing the resin against discoloration by light, a small proportion of an aliphatic amine having an ionization constant greater than $10^{-9}$ and a boiling point above 200° C. at atmospheric pressure.

6. A plastic composition comprising a vinyl aromatic resin and, as an agent for stabilizing the resin against discoloraton by light, a small proportion of an alkyl amine having an ionization constant greater than $10^{-9}$ and a boiling point above 200° C. at atmospheric pressure.

7. A plastic composition comprising a vinyl aromatic resin and, as an agent for stabilizing the resin against discoloration by light, a small proportion of di-octyl amine.

8. Polystyrene stabilized against discoloration by light with between 0.1 and 3 per cent by weight of di-octyl amine.

9. A plastic composition comprising a vinyl aromatic resin and, as an agent for stabilizing the resin against discoloration by light, a small proportion of an amino alcohol having an ionization constant greater than $10^{-9}$ and a boiling point above 200° C. at atmospheric pressure.

10. A plastic composition comprising a vinyl aromatic resin and, as an agent for stabilizing the resin against discoloration by light, a small proportion of an amino-glycol having an ionization constant greater than $10^{-7}$ and a boiling point above 200° C. at atmospheric pressure.

11. Polystyrene stabilized against discoloration by light with a small proportion of an amino-glycol having an ionization constant greater than $10^{-7}$ and a boiling point above 200° C. at atmospheric pressure.

12. Polystyrene stabilized against discoloration by light with between 0.1 and 3.0 per cent by weight of 3-diethylamino-1,2-propane-diol.

13. A plastic composition comprising a vinyl aromatic resin and, as an agent for stabilizing the resin against discoloration by light, a small proportion of an alkanol amine having an ionization constant greater than $10^{-9}$ and a boiling point above 200° C. at atmospheric pressure.

14. Polystyrene stabilized against discoloration by light with a minor proportion of an alkanol amine having an ionization constant greater than $10^{-7}$ and a boiling point above 200° C.

15. A vinyl aromatic resin stabilized against discoloration by light with a small proportion of a dialkanol amine having an ionization constant greater than $10^{-9}$ and a boiling point above 200° C. at atmospheric pressure.

16. Polystyrene stabilized against discoloration by light with a small proportion of a dialkanol amine having an ionization constant greater than $10^{-7}$ and a boiling point above 200° C. at atmospheric pressure.

17. Polystyrene stabilized against discoloration by light with between 0.1 and 3 per cent by weight of diisopropanol amine.

18. A method for stabilizing a vinyl aromatic resin against discoloration by light which comprises incorporating therewith a small proportion of an agent selected from the class consisting of organic amines having ionization constants greater than $10^{-9}$ and boiling points above 200° C. at atmospheric pressure and their hydrohalides.

LORNE A. MATHESON.
RAYMOND F. BOYER.